United States Patent
Johnston et al.

(10) Patent No.: US 8,825,828 B2
(45) Date of Patent: Sep. 2, 2014

(54) METHOD AND SYSTEM FOR IMPLEMENTING NOTIFICATIONS

(71) Applicant: CA, Inc., Islandia, NY (US)

(72) Inventors: Eugene E. Johnston, Pittsburgh, PA (US); Jan Podrouzek, Prague (CZ)

(73) Assignee: CA, Inc., Islandia, NY (US)

( * ) Notice: Subject to any disclaimer, the term of this patent is extended or adjusted under 35 U.S.C. 154(b) by 73 days.

(21) Appl. No.: 13/648,841

(22) Filed: Oct. 10, 2012

(65) Prior Publication Data

US 2014/0101230 A1    Apr. 10, 2014

(51) Int. Cl.
*G06F 15/173* (2006.01)
*H04L 29/08* (2006.01)

(52) U.S. Cl.
CPC ..................... *H04L 67/02* (2013.01)
USPC ........................... 709/223; 709/203; 709/224

(58) Field of Classification Search
CPC ................. H04L 57/02; G06F 17/30923
USPC ................ 709/203, 217, 223, 224, 227
See application file for complete search history.

(56) References Cited

U.S. PATENT DOCUMENTS

| | | | |
|---|---|---|---|
| 6,799,184 B2 * | 9/2004 | Bhatt et al. ............ | 707/718 |
| 7,496,637 B2 * | 2/2009 | Han et al. ............... | 709/217 |
| 7,644,414 B2 * | 1/2010 | Smith et al. ............ | 719/328 |
| 7,797,306 B1 * | 9/2010 | Pather et al. ........... | 707/714 |
| 8,504,543 B1 * | 8/2013 | Andreessen et al. ... | 707/705 |
| 2005/0138032 A1 * | 6/2005 | O'Rourke et al. ...... | 707/10 |
| 2007/0100967 A1 * | 5/2007 | Smith et al. ............ | 709/219 |
| 2009/0125803 A1 * | 5/2009 | Bao et al. ................ | 715/235 |
| 2010/0281136 A1 * | 11/2010 | Deen et al. .............. | 709/217 |
| 2011/0214051 A1 * | 9/2011 | Petronijevic et al. .. | 715/255 |
| 2013/0219409 A1 * | 8/2013 | Woley et al. ............ | 719/313 |

* cited by examiner

*Primary Examiner* — Lashonda Jacobs

(74) *Attorney, Agent, or Firm* — Baker Botts, LLP

(57) ABSTRACT

A method for implementing notifications. The method includes storing data defining notification operations in a memory. The data defining notification operations include a hierarchy of Uniform Resource Identifiers (URIs) and Extensible Markup Language (XML) document schema defining XML documents. The method further includes receiving a notification command including an URI and a Hypertext Transfer Protocol (HTTP) method; determining a notification operation based on the data defining notification operations stored in the memory and the notification command received; and executing the notification operation based on the notification command.

21 Claims, 2 Drawing Sheets

METHOD AND SYSTEM FOR IMPLEMENTING NOTIFICATIONS

BACKGROUND

The present disclosure relates generally to methods and systems for implementing notifications, and more specifically, to methods and systems for implementing notifications in a web service Application Programming Interface ("API").

BRIEF SUMMARY

The present disclosure relates generally to methods or systems that enable an application to initiate, monitor, and/or answer a notification by using a web service Application Programming Interface ("API").

According to an embodiment of the disclosure, a method for implementing notifications includes storing data defining notification operations in a memory. The data defining notification operations include a hierarchy of Uniform Resource Identifiers (URIs) and Extensible Markup Language (XML) document schema defining XML documents. The method further includes receiving a notification command including an URI and a Hypertext Transfer Protocol (HTTP) method; determining a notification operation based on the data defining notification operations stored in the memory and the notification command received; and executing the notification operation based on the notification command.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
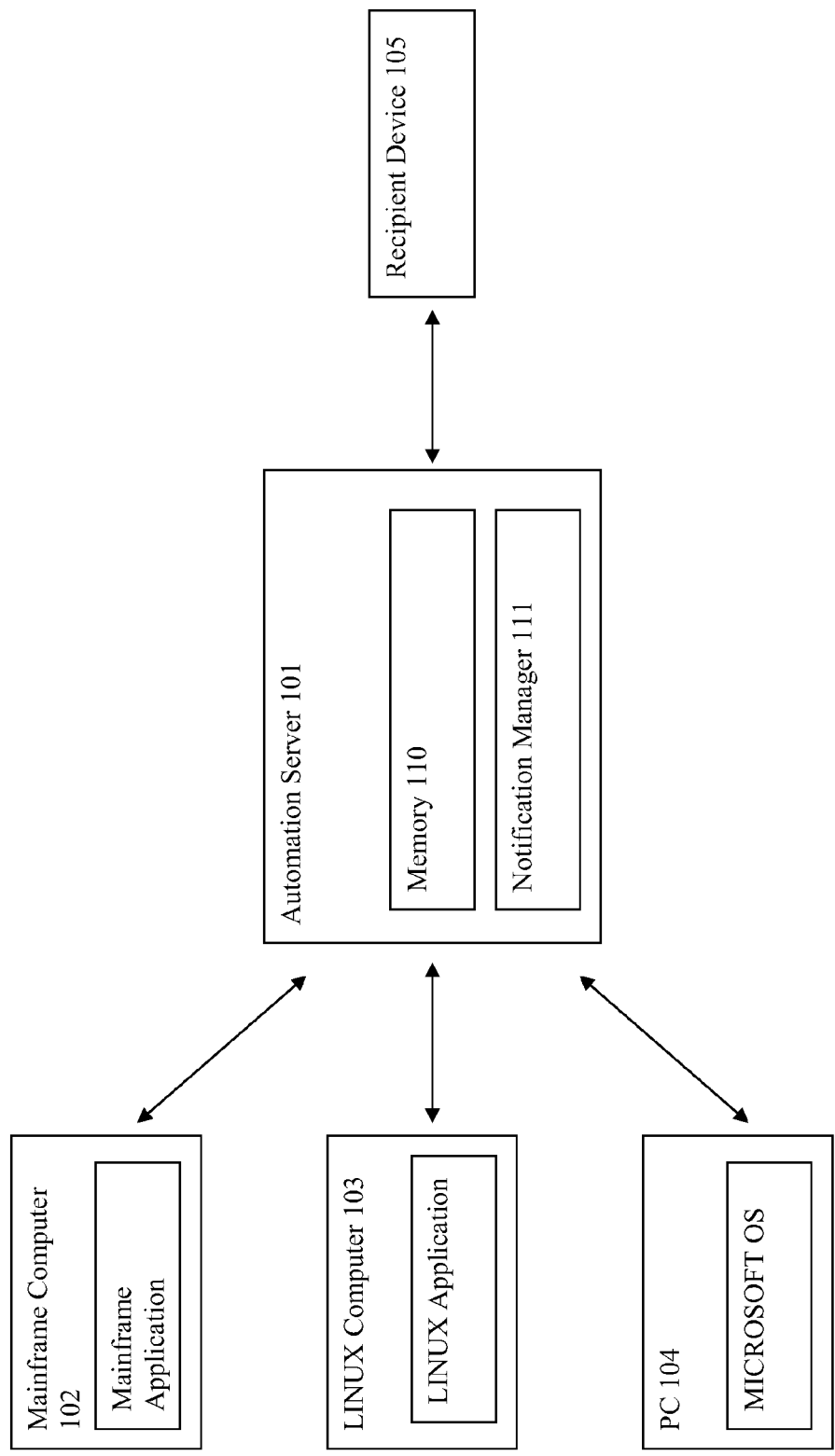
FIG. 1 is a diagram depicting a system for implementing notifications according to an embodiment of the disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as JAVA®, SCALA®, SMALLTALK®, EIFFEL®, JADE®, EMERALD®, C++, C#, VB.NET, PYTHON®, JAVASCRIPT® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY®, Groovy, JAVASCRIPT®, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable storage medium that when executed can direct a computer, other programmable data processing apparatus, or other devices to function in a particular manner, such that the instructions when stored in the computer readable storage medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Computer applications may perform actions in an automated fashion to resolve problems. Nevertheless, when computer applications are unable to resolve problems that impact system operations, technical personnel may be notified, such that the technical personnel may resolve such problems. The computer applications may notify the technical personnel. The computer applications that detect critical problems, which trigger notifications to a technical personnel, may request that a dedicated notification application perform the notifications.

When the computer application that detects the critical problems and the computer application for performing the notifications reside on different computers and are executed in different operating environment (e.g., different operating systems), the process of requesting a notification may become complicated. A technique for achieving a cross-application notification request may include locating both of these computer applications on the same computer and launching a command-line program from one computer application to make the request of the notification program on the other computer application. Another technique may include writing requests into a log file and remotely monitoring the log file or transferring the log file to a remote computer. Still another technique may include sending messages over a Transmission Control Protocol/Internet Protocol ("TCP/IP") connection established between the two computer applications. Nevertheless, these techniques may limit the flexibility of application deployment, may require continuing administrative maintenance, or may involve a complicated proprietary communication protocol.

The present disclosure may enable notification requests to be communicated among applications executed on different computers, written in different programming languages, under different operating systems, and located at different portions of the network.

Referring to FIG. 1, a notification implementing system may comprise an automation server 101 connected to a plurality of computers or devices via networks. For example, automation server 101 may be connected to one or more of a mainframe computer 102 that may execute a mainframe application, a LINUX computer 103 that may execute a LINUX operating system, and a PC computer 104 that may execute a MICROSOFT operating system. In another embodiment, automation server 101 may be connected to computers executing other types of operating systems, such as MAC operating system.

Automation server 101 may receive commands, messages, notifications, queries, or answers from one or more of mainframe computer 102, LINUX computer 103, and PC computer 104. For example, automation server 101 may receive a command to monitor operations of another computer in the network. Automation server 101 also may receive a request to initiate a notification to a certain device or computer. Further, automation server 101 may receive a query requesting a status of a notification. Automation server 101 may receive an answer to a previously sent notification. After receiving requests to initiate notifications, automation server 101 may generate and send notifications to devices or computers in the network. For example, automation server 101 may send a notification to a recipient device 105. Automation server 101 may comprise a notification manager that may facilitate all operations related to notifications.

Automation server 101 may implement a web service Application Programming Interface ("API"). The web service API may utilize a Representational State Transfer ("REST") architecture. Automation server 101 may receive requests or commands from other computers on the network utilizing the web service API. For example, requests may be sent from mainframe computer 102, LINUX computer 103, PC computer 104 to automation server 101 to request the automation server 101 initiate a notification to recipient device 105. The requests may be issued using Hypertext Transfer Protocol ("HTTP"). Automation server 101 may store a set of Uniform Resource Identifiers ("URI") each corresponding to a set of HTTP methods. Each of the stored URI's may be associated with an automation object for performing an operation. For example, the HTTP requests, e.g., GET and POST, may be issued against a published set of URI's. An HTTP request may comprise an Extensible Markup Language ("XML") document that may describe various parameters of the HTTP request. The web service API of automation server 101 may return a response comprising an XML document to provide the information that was requested. The XML documents used by the web service API may be defined by an XML schema stored in a memory of automation server 101. The web service API may implement operations such as: sending a notification, obtaining a list of existing notifications, obtaining the properties and status of a specific notification, answering a specific notification, and obtaining the properties of the answer to a notification. Accordingly, by utilizing the web service API, applications executed in a different operating system on different computers may request and implement notification processes executed at automation server 101, without storing information about notification requests in another external container and using ad-hoc techniques to transmit the notification requests to a remote notification program.

Figure 2:
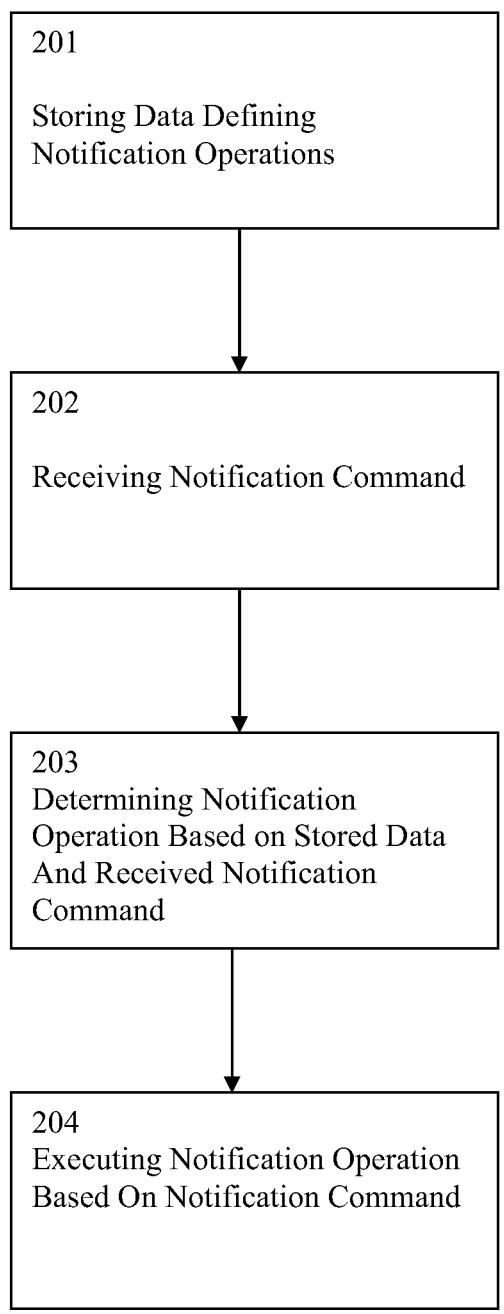
FIG. 2 is a flowchart depicting a notification process according to an embodiment of the disclosure.

Referring to FIG. 2, a notification process may be executed by automation server 101. At step 201, a pre-defined hierarchy of URI's may be stored in a memory 110 of automation server 101. Each of the URI's may represent an automation object upon which operations are performed. The URI's may be specific to automation server 101, such that automation server 101 may be accessible to computers residing at a specific portion of the network. The URI's may be similar to the URI's used in an internet browser, e.g., "http://www.ca.com." Information regarding which HTTP commands may be issued against a particular URI, and which operations each HTTP command may perform against a corresponding object may also be stored in memory 110 of automation server 101. Further, memory 110 may store XML schema defining XML documents that may be included in each HTTP request.

At step 202, automation server 101 may receive a web service request for notification operation from a computer in the network. For example, one of mainframe computer 102, LINUX computer 103, and PC computer 104 may send a web service request to automation server 101 to initiate a notification operation. The web service request may be a RESTful HTTP command including an attached XML payload containing parameters for desired operations. A set of various XML documents may apply to each specific HTTP command issued against a specific URI.

At step 203, automation server 101 may interpret the received HTTP commands based on the URI and the XML documents enclosed in the HTTP commands. Automation server 101 may determine operations to be performed based on the URI and the XML documents. For example, automation server 101 may determine whether a HTTP command is valid by comparing the URI and XML documents enclosed in the HTTP command with a hierarchy of URI's and XML schema stored in memory 110. Automation server 101 may determine a proper response including reply XML documents to the HTTP command.

At step 204, automation server 101 may execute operations based on the received HTTP command. For example, when the received HTTP command is not valid, automation server 101 may reply with an XML error document indicating an error. Based on a valid HTTP command, automation server 101 may reply with an XML document supplying information requested by the requesting computer. For example, automation server may return an XML document indicating a status of a previously initiated notification. Based on a valid HTTP command, automation server 101 may generate and send a notification to recipient 105. Automation server 101 may execute various operations related to notifications based on the received HTTP command.

URIs, HTTP Methods, and XML Documents

The HTTP command may comprise URI that may represent a resource of automation server 101 upon which operations may be performed. The meaning of an HTTP command may be determined by a specified URI. The HTTP command may identify the XML documents for the operations to be performed. An example of the base name of a URI targeted to the web service API of automation server 101 running under TOMCAT using Transport Layer Security ("TLS") may be:

https://localhost:8443/apwebsvc

This example base name may be used for all URI's listed in the following examples. Another host name may be used based on which computer an automation application is executed. Further, a site may be chosen to configure TOMCAT to use a non-default port number. In addition, during initial testing, a site may choose to avoid TLS for simplicity. Consequently, the HTTP scheme and the non-TLS default TOMCAT port of 8080 may be used.

Special characters may be introduced when specifying a query, which is expressed as part of the URI. When the URI contains such special characters, the URI may be enclosed in double quotes. For example, when requesting a list of all notifications that are waiting for a response from the recipient, a GET request may be issued with a query:

https://localhost:8443/apwebsvc/notifications?Status=AwaitingResponse

On the WINDOWS operating system executed on WINDOWS computer 102, the equals sign may be interpreted by the Windows Command Interpreter. The syntax may not be interpreted as a single URI parameter, and the command may fail. To prevent the WINDOWS operating system from misinterpreting this parameter, the parameter may be enclosed in double quotes: "https://localhost:8443/apwebsvc/notifications?Status=AwaitingResponse"

XML documents that may be identified in HTTP commands may be defined by corresponding XML schemas. In XML documents, web service API may utilize namespaces to avoid naming conflicts. The web service API namespace may be set as the default namespace in an attribute of the root element. Setting this attribute may allow all automation elements not to require qualifiers in this document. Each XML document may be validated against a corresponding XML schema that defines the XML document. The name and location of the XML schema may be specified as an attribute in the root element.

The following may be an example of the general format:

```
<?xml version="1.0" encoding="utf-8"?>
<YourXMLDocumentRootElement
    xmlns:xsi="http://www.w3.org/2001/XMLSchema-instance"
    xsi:schemaLocation="http://www.ca.com/distauto/ap/websvc/msgData
    XmlSchemaName.xsd"
    xmlns="http://www.ca.com/distauto/ap/websvc/msgData">
<ContentOfYourXMLDocument>
</YourXMLDocumentRootElement>
```

The XML schema name may change from one document to another.

The following example may send a simple notification:

```
<?xml version="1.0" encoding="utf-8"?>
<NotificationRequest
    xmlns:xsi="http://www.w3.org/2001/XMLSchema-instance"
    xsi:schemaLocation="http://www.ca.com/distauto/ap/websvc/msgData
    NotificationRequest.xsd"
    xmlns="http://www.ca.com/distauto/ap/websvc/msgData">
<Name>PersonThatYouWantToNotifiy</Name>
<Tell>Hi. This is a notification test.</Tell>
</NotificationRequest>
```

Query String in URIs

An URI may comprise a query string. The URI's may follow the "Uniform Resource Identifier (URI)" of RFC 3986. Thus, a query component may contain non-hierarchical data that, along with data in the path component, serves to identify a resource within the scope of the URI's scheme and naming authority (if any). The query component may be indicated by the first question mark ("?") character and terminated by a number sign ("#") character or by the end of the URI. Query components may be used to carry identifying information in the form of "key=value" pairs. Multiple query options may be applied when specifying a URI that accepts a query string. When specifying multiple query options, each option may be separated with an ampersand (&) character. An example is shown below:

URI-path?option1=value1&option2=value2

When an unknown query option is specified, the operation may return an HTTP status error of 400 (Bad Request) and the operation may return an XML error document. If a valid query option is specified, but the valid query is not applicable due to a conflict with another query option, the non-applicable option may be ignored and the operation may be processed.

Within some query strings, a pattern-matching expression may be used as the value of a query option. For example, a "." character may be used to mach any one character. A "*" character may be used to match any zero or more characters. A "\" character may serve as an escape character. A "\" character sequence may be used to match the "." character. A "\" character may be used to match the "*" character. Further, a "\\" character may be used to match the "\" character. Other escape sequence may be treated as an error. For example, the string "AX\C" may be an invalid pattern.

Notification URIs

The following are examples of URI's related to notifications that may be processed by notification manager 111 of automation server 101.

URI https://localhost:8443/apwebsvc/notifications

The above URI may represent the notifications that are currently being or have been processed by notification manager 111.

a. GET Notifications

The web service request GET notifications may obtain a list of notifications. Notification ID's may be returned in response to the web service request. By default, the notification ID's may be listed in order from the oldest notification to the latest notification. The following HTTP query strings may be added to the web service request GET notifications to control the volume and order of returned URI's.

"AnswerableBy=" may specify a contact name that is allowed to answer the notification;

"IssuedBy=" may specify a name of the login that issued the notification;

"Status=" may specify one of the following statuses for notification: Initializing, Sending, Sent, AwaitingResponse, NoResponse, Responded, LateResponse, or Failed.

"FromTime=" may be a timestamp specifying the time in seconds elapsed since midnight Coordinated Universal Time (UTC), Jan. 1, 1970. Notifications that occurred at the specified time or later may be returned. An error may occur when specifying a value that is larger than the value of the ToTime query option described below, when FromTime and ToTime are specified.

"ToTime=" may be a timestamp specifying the time in seconds elapsed since midnight Coordinated Universal Time (UTC), Jan. 1, 1970. Notifications that occurred at the specified time or sooner may be returned. An error may occur when specifying a value that is smaller than the value of the FromTime query option, when FromTime and ToTime are specified.

"AfterId=" may specify a notification ID of one notification, after which notifications are retrieved. Notifications that occurred after AfterId may be returned. The last notification ID returned in a previous GET request may be used as the AfterId in the next GET request. If the special value 0 is specified for AfterId, the GET method may return the last (most recent) notification ID. Since one notification ID may be returned in this case, a Count option specified in the same request may be ignored.

"Count=" may be the maximum number of notification IDs to be returned in the request. The highest value that may be set for this option may be 100000. When this option is not specified, a default value of 10000 may be used. When fewer notifications than Count are available, the Count value returned in the reply document may specify the actual number of notifications returned.

The following are pseudo code examples of implementing URI's with query options. Example 1 may continuously retrieve notifications that arrive after the first GET operation. It also may limit the number of notifications that are retrieved to ten at a time.

Example 1

```
LastIdOfOurPreviousGet = 0
while ( YouWantToContinue )
{
    GET .../notifications?AfterId=LastIdOfOurPreviousGet&Count=10
    If ( our reply contains notification IDs )
    {
        Do something with the retrieved notification IDs
        LastIdOfOurPreviousGet = last ID from our reply
    }
    Sleep a little while
}
```

Example 2 may obtain all notifications that occurred starting at 9:00 AM this morning and may stop when the last notification is reached.

Example 2

```
GET .../notifications?FromTime=TimeFor9:00AMToday&Count=10
While ( the number retrieved > 0 )
{
    Do something with the retrieved notification IDs
    LastIdOfOurPreviousGet = last ID from our reply
    If ( number retrieved < 10 )
        break
    GET .../notifications?AfterId=LastIdOfOurPreviousGet&Count=10
}
```

The HTTP request for the GET notification may not comprise an XML document. The HTTP request headers for the GET notifications may comprise an Authorization header for supplying a user ID and password in the HTTP Basic Authentication format. The user ID may be a login name known to the notification system. The HTTP response headers for the GET notifications may comprise a status of 200 indicating a successful result. When HTTP requests for the GET notifications are successfully implemented, an XML document of NotificationList defined in schema NotificationList.xsd may be the reply document sent back to the requesting computer. The following may be an example of the schema component representation of NotificationList:

```
<xs:element name="NotificationList">
    <xs:complexType>
        <xs:sequence>
            <xs:element name="Notification" minOccurs="0"
                maxOccurs="unbounded">
                <xs:complexType>
                    <xs:simpleContent>
                        <xs:extension base=" xs:positiveInteger ">
                            <xs:attribute name="href" type="
                                xs:anyURI " use="required"/>
                        </xs:extension>
                    </xs:simpleContent>
                </xs:complexType>
            </xs:element>
        </xs:sequence>
        <xs:attribute name="count" type=" xs:nonNegativeInteger "
            use="required"/>
    </xs:complexType>
</xs:element>
```

A Notification List element main comprise a list of notifications. "NotificationList" may comprise an attribute of "count," which may specify the number of "Notification" elements comprised in the "NotificationList" element. The value of the "Notification" element may be the ID of the notification. Its "href" attribute may comprise the URI of the resource representing the details of the notification.

The reply to the web service request GET notification may comprise a list of identifiers for existing notification requests. The reply may include the URIs used to access the existing notifications. For example the list may be:

http://localhost:8080/apwebsvc/notifications/notificationId1,
http://localhost:8080/apwebsvc/notifications/notificationId2,
and so on.

When the user has privilege to view all notifications, the list may comprise every notification. Otherwise the user may retrieve those notifications for which the user was directly involved with the notification. Specifically, the user who sent the notification, the user who was the intended recipient, or the user who was notified during the escalation process.

b. OPTIONS Notifications

The web service request OPTIONS notifications may obtain a list of HTTP commands that may be issued against an URI. The web service request OPTIONS Notifications may not have query options. The web service request for the OPTIONS notification may not include a request XML document. The HTTP request headers for the OPTIONS notifications may comprise an Authorization header for supplying a user ID and password in the HTTP Basic Authentication format. The user ID may be a login name known to the notification system. The HTTP response headers for the OPTIONS notifications may comprise a status of 200 indicating a successful result and an Allow header listing allowed methods and may contain OPTIONS, GET, HEAD, and POST when the user has the Notify All Contacts privilege.

When HTTP requests for the OPTIONS notifications are successfully implemented, an XML document of AllowedMethods defined in schema AllowedMethods.xsd may be the reply document sent back to the requesting computer. The following may be an example of the schema component representation of AllowedMethods:

```
<xs:element name="AllowedMethods">
    <xs:complexType>
        <xs:sequence>
            <xs:element name="Method" minOccurs="0"
            maxOccurs="unbounded">
                <xs:simpleType>
                    <xs:restriction base=" xs:string ">
                        <xs:enumeration value="OPTIONS"/>
                        <xs:enumeration value="GET"/>
                        <xs:enumeration value="HEAD"/>
                        <xs:enumeration value="POST"/>
                        <xs:enumeration value="PUT"/>
                        <xs:enumeration value="DELETE"/>
                        <xs:enumeration value="TRACE"/>
                        <xs:enumeration value="CONNECT"/>
                    </xs:restriction>
                </xs:simpleType>
            </xs:element>
        </xs:sequence>
    </xs:complexType>
    <xs:unique name="uniqueMethod">
        <xs:selector xpath="Method"/>
        <xs:field xpath="."/>
    </xs:unique>
</xs:element>
```

An AllowedMethods element may comprise information about the HTTP commands supported for a specific URI. The "Method" element may represent one allowed HTTP method. This element may appear zero or more times, each time with a unique value.

c. POST Notifications

The web service request POST notifications may send a notification. The web service request POST notifications may not have query options. The HTTP request for the OPTIONS notification may include a request XML document NotificationRequest defined in XML schema NotificationRequest.xsd. The HTTP request may comprise characteristics of the notification, such as who is notified and what the notification system should tell that person. The following may be an example of the schema component representation of NotificaitonRequest:

```
<xs:element name="NotificationRequest">
    <xs:complexType>
        <xs:sequence>
            <xs:element name="Name" type=" xs:string " minOccurs="1" maxOccurs="1"/>
            <xs:element name="Tell" type=" xs:string " minOccurs="1" maxOccurs="1"/>
            <xs:element name="Ask" minOccurs="0" maxOccurs="1">
                <xs:complexType>
                    <xs:sequence>
                        <xs:element name="Question" type=" xs:string " minOccurs="1"
                        maxOccurs="1"/>
                        <xs:element name="Choice" minOccurs="0" maxOccurs="9">
                            <xs:complexType>
                                <xs:sequence>
                                    <xs:element name="Answer" type=" xs:string " minOccurs="1"
                                    maxOccurs="1"/>
                                    <xs:element name="Action" type=" xs:string " minOccurs="0"
                                    maxOccurs="1"/>
                                </xs:sequence>
                            </xs:complexType>
                        </xs:element>
                        <xs:element name="EscalateWaitSec" minOccurs="0" maxOccurs="1">
                            <xs:simpleType>
                                <xs:restriction base=" xs:positiveInteger ">
                                    <xs:minInclusive value="1"/>
                                    <xs:maxInclusive value="3600"/>
                                </xs:restriction>
                            </xs:simpleType>
                        </xs:element>
                    </xs:sequence>
                </xs:complexType>
            </xs:element>
            <xs:element name="MethTypesToUse" minOccurs="0" maxOccurs="1">
                <xs:simpleType>
```

```
                <xs:restriction base=" xs:string ">
                    <xs:pattern value="A|[B–W]+"/>
                </xs:restriction>
            </xs:simpleType>
        </xs:element>
        <xs:element name="AcknowledgeAP" minOccurs="0" maxOccurs="1">
            <xs:complexType>
                <xs:sequence>
                    <xs:element name="Message" type=" xs:string " minOccurs="1"
                    maxOccurs="1"/>
                </xs:sequence>
            </xs:complexType>
        </xs:element>
        <xs:element name="AcknowledgeOPS" minOccurs="0" maxOccurs="1">
            <xs:complexType>
                <xs:sequence>
                    <xs:element name="Message" type=" xs:string " minOccurs="1"
                    maxOccurs="1"/>
                    <xs:element name="Hostname" type=" xs:string " minOccurs="1"
                    maxOccurs="1"/>
                </xs:sequence>
            </xs:complexType>
        </xs:element>
        <xs:element name="AcknowledgeNSM" minOccurs="0" maxOccurs="1">
            <xs:complexType>
                <xs:sequence>
                    <xs:element name="Message" type=" xs:string " minOccurs="1"
                    maxOccurs="1"/>
                    <xs:element name="Hostname" type=" xs:string " minOccurs="0"
                    maxOccurs="1"/>
                </xs:sequence>
            </xs:complexType>
        </xs:element>
        <xs:element name="Attachment" minOccurs="0" maxOccurs="1">
            <xs:simpleType>
                <xs:restriction base=" xs:string ">
                    <xs:whiteSpace value="preserve"/>
                    <xs:maxLength value="512"/>
                </xs:restriction>
            </xs:simpleType>
        </xs:element>
        <xs:element name="MethParmOverride" minOccurs="0" maxOccurs="unbounded">
            <xs:complexType>
                <xs:sequence>
                    <xs:element name="ParmName" minOccurs="1" maxOccurs="1">
                        <xs:simpleType>
                            <xs:restriction base=" xs:string ">
                                <xs:whiteSpace value="collapse"/>
                            </xs:restriction>
                        </xs:simpleType>
                    </xs:element>
                    <xs:element name="ParmValue" minOccurs="1" maxOccurs="1">
                        <xs:simpleType>
                            <xs:restriction base=" xs:string ">
                                <xs:whiteSpace value="preserve"/>
                            </xs:restriction>
                        </xs:simpletype>
                    </xs:element>
                </xs:sequence>
            </xs:complexType>
        </xs:element>
    </xs:sequence>
    <xs:attribute name="Debug">
        <xs:simpleType>
            <xs:restriction base=" xs:string ">
                <xs:enumeration value="yes"/>
                <xs:enumeration value="no"/>
            </xs:restriction>
        </xs:simpleType>
    </xs:attribute>
    <xs:attribute name="FailureRexx">
        <xs:simpleType>
            <xs:restriction base=" xs:string ">
                <xs:whiteSpace value="preserve"/>
                <xs:maxLength value="512"/>
            /xs:restriction>
        </xs:simpleType>
```

```
    </xs:attribute>
  </xs:complexType>
</xs:element>
```

A NotificationRequest document may be sent to automation server 101 to request sending of a notification. The following optional attributes may be supplied for the 'NotificationRequest' element:

Attribute "Debug" may specify whether debugging messages are to be generated. The possible values for "Debug" are listed below. The 'Debug' attribute may be optional. If the "Debug" attribute is not supplied, the default value may be "no".

yes=Generate debugging messages
no=Do not generate debugging messages

Attribute "FailureRexx" may specify the name of a REXX program to run when every possible notification action has failed. A "FailureRexx" attribute may be optional. The "FailureRexx" file may be accessible from automation server 101 that is issuing the notification.

The "NotificationRequest" document may comprise the following elements.

"Name" element may specify the name of the person or group to be notified. This element may be required.

"Tell" element may specify the text of the notification to be sent. This element may be required.

"Ask" element may specify a question and a set of possible answers. An "Ask" element may be optional. When an "Ask" is specified, a notification may not be considered successful until an answer is received from the recipients who have the privilege to answer the notification. The "Ask" element contains the following elements.

"EscalateWaitSec" may specify the number of seconds that the notification may wait after all notification methods at a given level are exhausted, before escalating the notification. This may give contacts additional time to respond. If there is a response during the wait period, the notification may be considered successful and escalation may not occur. The "EscalateWaitSec" element may be optional. If not specified, the notification may be escalated as soon as all notification methods at the current level have been attempted.

"Question" may specify the question to be asked of the recipient.

"Choice" may specify a combination of answer and optional action that may be taken if the corresponding answer is selected by the recipient. Up to nine choices may be specified. If no choices are specified, two default choices may automatically be utilized: the first choice may be TRUE and the second choice may be FALSE.

"Answer" element may specify the text representing the answer for this choice. One "Answer" element may be specified for an "Choice" element that is specified.

"Action" element may specify the name of a REXX program to be run if this choice is selected by the recipient. An "Action" element may not be required as part of a "Choice" element. These REXX program names may comprise the associated file extension (.REX or .CMD). The file may be accessible from automation server 101 that is issuing the notification. Each REXX action program may set a return code on exit. The return code value may be either 0 or any number greater than 9.

"MethTypesToUse" element may specify which types of methods are attempted for a particular notification request. The method type for each method may be defined in a database of notification manager 111 within the "Method Type" parameter. Before attempting to notify a contact using a particular method, notification manager 111 may compare the value of that method's type with the value of "MethTypesToUse." If the value of the type parameter is part of the "MethTypesToUse" value, then the notification may be attempted using that method. If the type parameter is not part of the "MethTypesToUse" value, then the notification may not be attempted, and the next scheduled method may be compared to the "MethTypesToUse" value. The value of "MethTypesToUse" may be any string of letters from "A" through "W." The value of "MethTypesToUse" may contain the following values:

A=All method types may be used for all active schedules. No comparisons may be made, and all methods may be attempted.

Any combination of method type parameter values B through W The "MethTypesToUse" element may be optional. If the "MethTypesToUse" element is not supplied, the value "A" may be used as default.

Consider the following scenario: information for Employee Terry Jones may be entered into the database of notification manager 111, and may have two 24×7 time blocks defined. One time block may use "EMail 1" as a method and the other may use "Numeric Pager 1." A notification may be issued for Terry Jones without "MethTypesToUse" specified. The value of "MethTypesToUse" defaults to "A", and no comparisons may be made. By default, both the "EMail 1" and "Numeric Pager 1" methods may be attempted.

Consider the following scenario: assume that all email notification methods within the notification system have a method type indicator of "E", and all pager notification methods have a method type indicator of "P". When "MethTypesToUse" contains the value "A", or the value "EP", or "MethTypesToUse" is not supplied (which defaults to "A"), both email and paging types of methods may be used to perform the notification. If "MethTypesToUse" contains only the value "E", only email notification methods may be used. If "MethTypesToUse" contains only the value "P", only paging notification methods may be used.

"AcknowledgeAP" element may specify that an acknowledgement message is to be sent to automation server 101. "Acknowledge AP" may be an optional element. The elements of "AcknowledgeAP" may include "Message" element that may specify the acknowledgement text to be sent.

"AcknowledgeOPS" element may specify that an acknowledgement message is to be sent to OPS MVS/EMA. This may be an optional element. The elements of "AcknowledgeOPS" element may include a "Message" element that may specify the acknowledgement text to be sent, and a "Hostname" element that specify the name of the target host which is currently configured and active.

"AcknowledgeNSM" element may specify that an acknowledgement message is to be sent to Network and Systems Management. This may be an optional element. The elements of "AcknowledgeNSM" element may include a "Message" element that may specify the acknowledgement text to be sent and a "Hostname" element that may specify the name of the target host. If it's not specified, all NSM hosts configured within the automation server 101 may receive a copy of the acknowledgement message.

"Attachment" element may specify the name of a file that is to be attached to a notification which is sent by an email notification method. The file may be accessible from the automation server 101 that is issuing the notification. One file name may be specified. The maximum length of the filename (including path) may be 512 characters. An "Attachment" element is optional.

"MethParmOverride" element may specify a method parameter name and parameter value that may override any like-named method parameter during the processing of a notification. For example, if the "SubjectText" ParmName is specified, its associated ParmValue may override the parameter "SubjectText" for any method that uses the "SubjectText" parameter. The "MethParmOverride" element may be optional. The "MethParmOverride" element may be specified multiple times to override multiple method parameters. The "MethParmOverride" element may contain "ParmName" element that may specify the name of a method parameter whose value should be overridden and "ParmValue" element that may specify the value to be used for the method parameter.

The HTTP request headers for the POST notifications may comprise an Authorization header for supplying a user ID and password in the HTTP Basic Authentication format. The user ID may be a login with the privilege to notify all contacts on automation server 101 that is the target of the HTTP method. The HTTP response headers for the OPTIONS notifications may comprise a status of 200 indicating a successful result and a Location containing URI to the newly created notification.

When HTTP requests for the POST notifications are successfully implemented, an XML document of NotificationRequestReply defined in schema NotificationRequest.xsd may be the reply document sent back to the requesting computer. The following may be an example

```
<xs:element name="NotificationRequestReply">
    <xs:complexType>
        <xs:sequence>
            <xs:element name="Notification" minOccurs="1"
                maxOccurs="1">
                <xs:complexType>
                    <xs:simpleContent>
                        <xs:extension base=" xs:positiveInteger ">
                            <xs:attribute name="href" type="
                                xs:anyURI " use="required"/>
```

-continued

```
                        </xs:extension>
                    </xs:simpleContent>
                </xs:complexType>
            </xs:element>
        </xs:sequence>
    </xs:complexType>
</xs:element>
```

A NotificationRequestReply document may be sent from automation server 101 back to a requesting computer in response to the receipt of a "NotificationRequest" document. A "NotificationRequestReply" document may contain an "Notification" element which may contain the numeric ID of the notification that was created by the "NotificationRequest." This may be the same ID used by recipients to identify the notification when they answer a notification. The "Notification" element may contain the "href" attribute which may specify the URI that may be used to access this specific notification in future operations.

d. URI https://localhost:8443/apwebsvc/notifications/<notificationId>

This URI may represent a specific notification that is identified by its ID number.

e. GET notifications/<notificationId>

The web service request GET notifications/<notificationId> may obtain the properties of a specific notification. The web service request GET notifications/<notificationId> may not have query options. The HTTP request for GET notifications/<notificationId> may not include a request XML document. The HTTP request headers for GET notifications/<notificationId> may comprise an Authorization header for supplying a user ID and password in the HTTP Basic Authentication format. The user ID may be a login name known to the notification system. The HTTP response headers for GET notifications/<notificationId> may comprise a status of 200 indicating a successful result.

When HTTP requests for GET notifications/<notificationId> are successfully implemented, an XML document of Notification defined in schema Notification.xsd may be the reply document sent back to the requesting computer. The following is an example of the schema component representation of Notification:

```
<xs:element name="Notification">
    <xs:complexType>
        <xs:sequence>
            <xs:element name="IntendedRecipient" type=" xs:string " minOccurs="1"
                maxOccurs="1"/>
            <xs:element name="Tell" type=" xs:string " minOccurs="1" maxOccurs="1"/>
            <xs:element name="Ask" minOccurs="0" maxOccurs="1">
                <xs:complexType>
                    <xs:sequence>
                        <xs:element name="Question" type=" xs:string " minOccurs="1"
                            maxOccurs="1"/>
                        <xs:element name="Choice" minOccurs="0" maxOccurs="9">
                            <xs:complexType>
                                <xs:simpleContent>
                                    <xs:extension base=" xs:string ">
                                        <xs:attribute name="Number" type=" xs:positiveInteger "
                                            use="required"/>
                                    </xs:extension>
                                </xs:simpleContent>
                            </xs:complexType>
```

```
          </xs:element>
        </xs:sequence>
      </xs:complexType>
    </xs:element>
    <xs:element name="SenderLogin" type=" xs:string " minOccurs="1"
    maxOccurs="1"/>
    <xs:element name="TimeSent" type=" xs:string " minOccurs="1"
    maxOccurs="1"/>
    <xs:element name="Status" minOccurs="1" maxOccurs="1">
      <xs:complexType>
        <xs:simpleContent>
          <xs:extension base=" StatusEnum ">
            <xs:attribute name="NumericResult" type=" xs:integer " use="required"/>
          </xs:extension>
        </xs:simpleContent>
      </xs:complexType>
    </xs:element>
  </xs:sequence>
</xs:complexType>
</xs:element>
```

A Notification document may be returned in response to a query against an existing notification. A "Notification" document may comprise the following elements.

"IntendedRecipient" element may comprise the contact name of the person or device to which the notification was originally sent. The "IntendedRecipient" element may be required.

"Tell" element may comprise the text that notification manager 111 tells the recipients of the notification. The "Tell" element may be required.

"SenderLogin" element may specify the Login name of the person who sent the notification. A particular login Name may be responsible for sending a notification when the notification is sent by using the notification website or when the notification is sent by the web service API. The "SenderLogin" element may be required.

"TimeSent" element may contain the time at which the notification was sent. The "TimeSent" element may be required. The "TimeSent" element may be an integer that specifies the number of seconds elapsed since midnight, Jan. 1, 1970 UTC. For example, to represent Sep. 2, 2011 at 18:05:35 UTC, a value of 1314986735 may be specified.

"Ask" element may specify the question that is asked of the recipients of the notification and a set of possible answers. The "Ask" element contains the following elements.

"Question" element may comprise the question asked of the recipients.

"Choice" element may specify possible answers from which the recipients may choose. The "Choice" element also may contain the following attribute.

"Number" may comprise a numeric code associated with the possible answer (choice).

"Status" element may indicate the current status of the notification. The "Status" value may take on one of the following values:

Initializing—The notification has been submitted, but has not yet processed.

Sending—The notification is currently being processed.

Sent—The notification was successfully sent. It does not contain a Question (ASK).

AwaitingResponse—The notification was successfully sent and the process is waiting for a response.

Responded—The notification was successfully sent, and a valid response was received.

NoResponse—The notification was successfully sent, but no valid response was received.

LateResponse—The notification was successfully sent, and a valid response was received after the processing of the notification ended. Therefore no action that is associated with the answer choice was performed.

Failed—The notification was processed but did not complete successfully.

The "Status" element also may contain the following attribute.

"NumericResult" may contain a numeric code associated with the status. This value may contain a more specific identification of the notification status that may be useful for troubleshooting.

f. OPTIONS Notifications/<notificationId>

The web service request OPTIONS notifications/<notificationId> may obtain a list of HTTP methods that may be issued against this URI. The web service request OPTIONS notifications/<notificationId> may not have query options. The HTTP request for OPTIONS notifications/<notificationId> may not include a request XML document. The HTTP request headers for OPTIONS notifications/<notificationId> may comprise an Authorization header for supplying a user ID and password in the HTTP Basic Authentication format. The user ID may be a login name known to the notification system. The HTTP response headers for OPTIONS notifications/<notificationId> may comprise a status of 200 indicating successful result, and an Allow header indicating list of allowed methods including OPTIONS, GET, and HEAD.

When HTTP requests for OPTIONS notifications/<notificationId> are successfully implemented, an XML document of AllowedMethods defined in schema AllowedMethods.xsd may be the reply document sent back to the requesting computer. An example of the XML schema component representation of AllowedMethods has been described above with regard to the OPTIONS notifications URI.

g. URI https://localhost:8443/apwebsvc/notfications/notificationId>/answer

This URI may represent the answer for the notification that is identified by its ID number. When the notification did not ask a question, the associated answer URI may not exist.

h. GET notifications/<notificationId>/answer

The web service request GET notifications/<notificationId>/answer may obtain the properties of the answer to a notification. The web service request GET notifications/<notificationId>/answer may not have query options. The HTTP request for GET notifications/<notificationId>/answer may not include a request XML document. The HTTP request headers for GET notifications/<notificationId>/answer may comprise an Authorization header for supplying a user ID and password in the HTTP Basic Authentication format. The user ID may be a login name known to the notification system. The user also may have privilege to answer all notifications or an associated contact for that user may have been notified as part of the notification. The HTTP response headers for GET notifications/<notificationId>/answer may comprise a status of 200 indicating a successful result. A result of 404 (not found) may be returned when the associated notification did not ask a question and thus no answer exists.

When HTTP requests for GET notificationsi<notificationId>/answer are successfully implemented, an XML document of NotificationAnswer defined in schema NotificationAnswer.xsd may be the reply document sent back to the requesting computer. The following is an example of the schema component representation of NotificationAnswer.

```
<xs:element name="NotificationAnswer">
  <xs:complexType>
    <xs:sequence>
      <xs:element name="Answer" minOccurs="1" maxOccurs="1">
        <xs:complexType>
          <xs:simpleContent>
            <xs:extension base=" xs:string ">
              <xs:attribute name="AnswerNumber" use="required">
                <xs:simpleType>
                  <xs:restriction base=" xs:nonNegativeInteger ">
                    <xs:minInclusive value="0"/>
                    <xs:maxInclusive value="9"/>
                  </xs:restriction>
                </xs:simpleType>
              </xs:attribute>
            </xs:extension>
          </xs:simpleContent>
        </xs:complexType>
      </xs:element>
    </xs:sequence>
  </xs:complexType>
</xs:element>
```

A NotificationAnswer document may be issued as a reply document from automation server 101 in response to a query about the answer to a specific notification. It also may be sent to automation server 101 as the body of a request to set the answer for a specific notification. The answer for a notification may be set once. Subsequent attempts to answer a notification may result in an error. "NotificationAnswer" contains the following element.

"Answer" element may comprise the text associated with the answer that was set for a specific notification. A notification may contain a question. When a question is asked, multiple possible answers may be supplied to recipients. Each such choice may be numbered from 1 to 9 so that a recipient may answer the notification using a standard telephone handset. The value of the "Answer" element may comprise the text that was associated with the answer chosen by the recipient. When a notification has not yet been answered, the "Answer" text received in the reply to a query may be empty. When answering a notification the value of the "Answer" element may be ignored and may be kept empty.

The "Answer" element may comprise the following attribute. "AnswerNumber" attribute may comprise the number associated with the answer chosen by the recipient. When a notification has not yet been answered, the "AnswerNumber" received in the reply to a query may be zero.

i. OPTIONS notifications/<notificationId>/answer

The web service request OPTIONS notifications/<notificationId>/answer may obtain a list of HTTP methods that may be issued against this URI. The web service request OPTIONS notifications/<notificationId>/answer may not have query options. The HTTP request for OPTIONS notifications/<notificationId>/answer may not include a request XML document. The HTTP request headers for OPTIONS notifications/<notificationId>/answer may comprise an Authorization header for supplying a user ID and password in the HTTP Basic Authentication format. The user ID may be a login name known to the notification system. The user also may have the privilege to answer all notifications or an associated contact for that user may have been notified as part of the notification. The HTTP response headers for OPTIONS notifications/<notificationId>/answer may comprise a status of 200 indicating a successful result. A result of 404 (not found) may be returned when the associated notification did not ask a question and thus no answer exists. When HTTP requests for OPTIONS notifications/<notificationId>/answer are successfully implemented, an XML document of AllowedMethods defined in schema AllowedMethods.xsd may be the reply document sent back to the requesting computer. An example of the XML schema component representation of AllowedMethods has been described above with regard to the OPTIONS notifications URI.

j. PUT notifications/<notificationId>/answer

The web service request PUT notifications/<notificationId>/answer may answer a specific notification. The web service request PUT notifications/<notificationId>/answer may not have query options. The HTTP request for PUT notifications/<notificationId>/answer may include NotificationAnswer defined in schema NotificationAnswer.xsd as a request XML document. NotificationAnswer document may comprise numeric choice that identifies the answer for the specified notification in the AnswerNumber attribute. The allowed values may range from 1 to 9. The value of the answer element may be ignored and be empty. An example of the XML schema component representation of NotificationAnswer has been described above with regard to the GET notifications/<notificationId>/answer URI.

The HTTP request headers for PUT notifications/<notificationId>/answer may comprise an Authorization header for supplying a user ID and password in the HTTP Basic Authentication format. The user ID may be a login name known to the notification system. The user also may have either the privilege to answer all notifications or an associated contact for that user may have been notified as part of the notification. The HTTP response headers for PUT notifications/<notificationId>/answer may comprise a status of 200 indicating a successful result. A result of 404 (not found) may be returned when the associated notification did not ask a question and thus no answer exists. A result of 405 (method not allowed) may be returned when someone else already answered the notification. A result of 409 (conflict) may be returned when someone else answered the notification during the processing of this PUT request. The HTTP response headers for PUT notification/<notificationId> answer may comprise an Allow header indicating a list of allowed methods. The Allow header may contain OPTION, GET, and HEAD. No reply document is issued for the web service request PUT notification/<notificationId>/answer.

Using the above described HTTP commands including the URIs and XML documents, notification requests may be communicated among applications executed on different computers, written in different programming language, under different operating systems, and located at different portions of the network.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method for implementing notifications, the method comprising:
    storing data defining notification operations in a memory, the data defining notification operations comprising a hierarchy of Uniform Resource Identifiers (URIs) and Extensible Markup Language (XML) document schema defining XML documents;
    using a processor to:
        receive a notification command comprising an URI identifying a notification resource and a Hypertext Transfer Protocol (HTTP) GET method; and
        determine a notification operation based on the data defining notification operations stored in the memory and the notification command received;
        obtaining a list of notifications indicated in the notification; and
        returning a NotificationList XML document.

2. The method according to claim 1, wherein the notification command further comprises an Extensible Markup Language (XML) document.

3. The method according to claim 2, further comprising:
    receiving a second notification command comprising an HTTP PUT method and an URI identifying a notification resource associated with an answer of a notification ID and a NotificationAnswer XML document; and
    executing a second notification operation comprising answering a notification identified by the notification ID.

4. The method according to claim 2, further comprising:
    receiving a second notification command comprising an HTTP POST method and an URI identifying a notification resource and a NotificationRequest XML document; and
    executing a second notification operation comprising sending a notification and returning a NotificationRequestReply XML document.

5. The method according to claim 1, wherein the URI of the notification command comprises a query string.

6. The method according to claim 1, further comprising:
    receiving a second notification command comprising an HTTP OPTIONS method and an URI identifying a notification resource; and
    executing a second notification operation comprising obtaining a list of HTTP methods associated with the URI and returning an AllowedMethods XML document.

7. The method according to claim 1, further comprising:
    receiving a second notification command comprising an HTTP GET method and an URI identifying a notification resource associated with a notification ID; and
    executing a second notification operation comprising obtaining properties of a notification described in the URI and returning a Notification XML document.

8. The method according to claim 1, further comprising:
    receiving a second notification command comprising an HTTP OPTIONS method and an URI identifying a notification resource associated with a notification ID; and
    executing a second notification operation comprising obtaining a list of HTTP methods associated with the notification described in the URI and returning an AllowedMethods XML document.

9. The method according to claim 1, further comprising:
    receiving a second notification command comprising an HTTP GET method and an URI identifying a notification resource associated with an answer of a notification ID; and
    executing a second notification operation comprising obtaining properties of the answer to a notification identified by the notification ID and returning a NotificationAnswer XML document.

10. The method according to claim 1, further comprising:
    receiving a second notification command comprising an HTTP OPTIONS method and an URI identifying a notification resource associated with an answer of a notification ID; and
    executing a second notification operation comprising obtaining a list of HTTP methods associated with a notification identified by the notification ID and returning a AllowedMethods XML document.

11. A computer for implementing notifications, the computer comprising:

a memory for storing data defining notification operations, the data defining notification operations comprising a hierarchy of Uniform Resource Identifiers (URIs) and Extensible Markup Language (XML) document schema defining XML documents;

an interface for receiving a notification command comprising an URI identifying a notification resource and a Hypertext Transfer Protocol (HTTP) GET method; and a processor for:
- determining a notification operation based on the data defining notification operations stored in the memory and the notification command received;
- obtaining a list of notifications indicated in the notification; and
- returning a NotificationList XML document.

12. The computer according to claim 11, wherein the notification command further comprises an Extensible Markup Language (XML) document.

13. The computer according to claim 12, wherein the interface is further operable to receive a second notification command comprising an HTTP PUT method and an URI identifying a notification resource associated with an answer of a notification ID and a NotificationAnswer XML document, and the processor is further operable to execute a second notification operation comprising answering a notification identified by the notification ID.

14. The computer according to claim 12, wherein the interface is further operable to receive a second notification command comprising an HTTP POST method and an URI identifying a notification resource and a NotificationRequest XML document, and the processor is further operable to execute a second notification operation comprising sending a notification and returning a NotificationRequestReply XML document.

15. The computer according to claim 11, wherein the URI of the notification command comprises a query string.

16. The computer according to claim 11, wherein the interface is further operable to receive a second notification command comprising an HTTP OPTIONS method and an URI identifying a notification resource, and the processor is further operable to execute a second notification operation comprising obtaining a list of HTTP methods associated with the URI and returning an AllowedMethods XML document.

17. The computer according to claim 11, wherein the interface is further operable to receive a second notification command comprising an HTTP GET method and an URI identifying a notification resource associated with a notification ID, and the processor is further operable to execute a second notification operation comprising obtaining properties of a notification described in the URI and returning a Notification XML document.

18. The computer according to claim 11, wherein the interface is further operable to receive a second notification command comprising an HTTP OPTIONS method and an URI identifying a notification resource associated with a notification ID, and the processor is further operable to execute a second notification operation comprising obtaining a list of HTTP methods associated with the notification described in the URI and returning an AllowedMethods XML document.

19. The computer according to claim 11, wherein the interface is further operable to receive a second notification command comprising an HTTP GET method and an URI identifying a notification resource associated with an answer of a notification ID, and the processor is further operable to execute a second notification operation comprising obtaining properties of the answer to a notification identified by the notification ID and returning a NotificationAnswer XML document.

20. The computer according to claim 11, wherein the interface is further operable to receive a second notification command comprising an HTTP OPTIONS method and an URI identifying a notification resource associated with an answer of a notification ID, and the processor is further operable to execute a second notification operation comprising obtaining a list of HTTP methods associated with a notification identified by the notification ID and returning a AllowedMethods XML document.

21. A computer program product comprising:
- a computer-readable storage medium having computer-readable program code embodied therewith, the computer-readable program code comprising:
  - computer-readable program code configured to store data defining notification operations in a memory, the data defining notification operations comprising a hierarchy of Uniform Resource Identifiers (URIs) and Extensible Markup Language (XML) document schema defining XML documents;
  - computer-readable program code configured to receive a notification command comprising an URI identifying a notification resource and a Hypertext Transfer Protocol (HTTP) GET method;
  - computer-readable program code configured to determine a notification operation based on the data defining notification operations stored in the memory and the notification command received;
  - computer-readable program code configured to obtain a list of notifications indicated in the notification; and
  - computer-readable program code configured to return a NotificationList XML document.

* * * * *